[11] 3,587,383

| [72] | Inventor | Yohei Ikezu |
| | | Tokyo, Japan |
| [21] | Appl. No. | 829,918 |
| [22] | Filed | June 3, 1969 |
| [45] | Patented | June 28, 1971 |
| [32] | Priority | June 4, 1968 |
| [33] | | Japan |
| [31] | | 43/46727 |
| [73] | Assignee | Kabushiki Kaisha Ricoh, |
| | | Tokyo, Japan |

[54] FINDER LENS SYSTEM IN VIEWFINDER
2 Claims, 4 Drawing Figs.

[52] U.S. Cl............................................... 88/1.5,
350/203, 350/212, 350/224
[51] Int. Cl........................................ G03b 13/06,
G02b 17/00
[50] Field of Search....................................... 350/224,
175 (E), 232, 203, 212; 88/1.5; 95/42 ited
UNITED STATES PATENTS

| 1,197,742 | 9/1916 | Kellner.......................... | 350/232X |
| 2,366,597 | 1/1945 | Cox.............................. | 350/224 |
| 2,456,728 | 12/1948 | Ohman......................... | 350/232 |

*Primary Examiner*—David Schonberg
*Assistant Examiner*—Paul A. Sacher
*Attorney*—Burgess, Ryan and Hicks ABSTRACT: A viewfinder lens system for a hollow penta-roof-type reflecting mirror having an object lens and focal plane on one side of the reflecting mirror and a positive meniscus lens group located at 90° along the optical axis on the other side of the reflecting mirror along with a negative lens spaced from said positive lens group further along the optical axis. With the use of such hollow reflecting mirror it is desired to increase the magnification, and this is accomplished by designing the compound focal length of the positive and negative lens group to be at least equal to the focal length of the object lens, and the focal point of the positive and negative group to coincide with the focal plane.

INVENTOR
YOHEI IKEZU
BY Burgess, Ryan + Hicks
ATTORNEYS

3,587,383

FINDER LENS SYSTEM IN VIEWFINDER

BACKGROUND OF THE INVENTION

The present invention relates to a viewfinder system for a single-lens reflex camera and more particularly an improved viewing lens system providing a larger viewfinder magnification.

In the viewfinder for a single-lens reflex camera, the light rays from a subject passing through an object lens is reflected by a reflecting mirror substantially by a 90° toward a ground glass where the image is focused. This image can be viewed through a condenser lens, a pentaprism and a finder lens by the eye. When a porromirror system or a hollow penta-roof-type reflecting mirror is used instead of the pentaprism, the finder magnification is reduced because its refractive index is unity. Furthermore, even in case of a pentaprism, the magnification is reduced when a lens having a shorter focal length is used, so that the focus adjustment becomes difficult in both cases.

SUMMARY OF THE INVENTION

In brief, in order to eliminate such defect as described above the present invention provides a viewfinder lens system comprising a positive meniscus lens group and a negative meniscus lens spaced apart rearwardly from said group, the principal point of said system being positioned forwardly of said system and the back focus being made longer.

One of the objects of the present invention is to provide a single-lens reflex camera provided with a finder system capable of providing a larger finder magnification.

The above and other objects, features and advantages of the present invention will become more apparent from the following description of a preferred embodiment thereof in conjunction with the accompanying drawing.

DESCRIPTION OF THE PREFERRED EMBODIMENT

Figure 1:
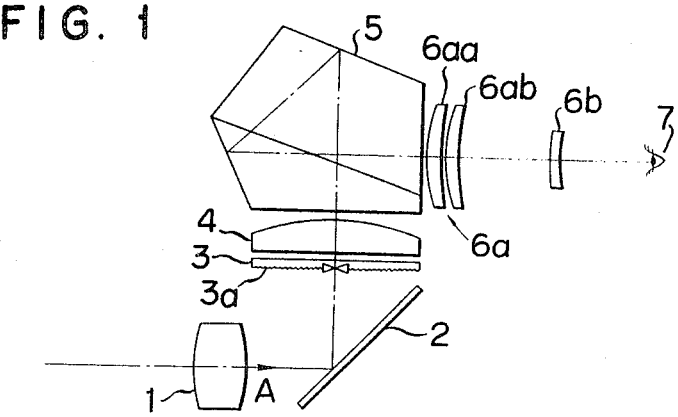
FIG. 1 is an optical system of a single-lens reflex camera incorporating therein a finder lens system according to the present invention.
Figure 2:
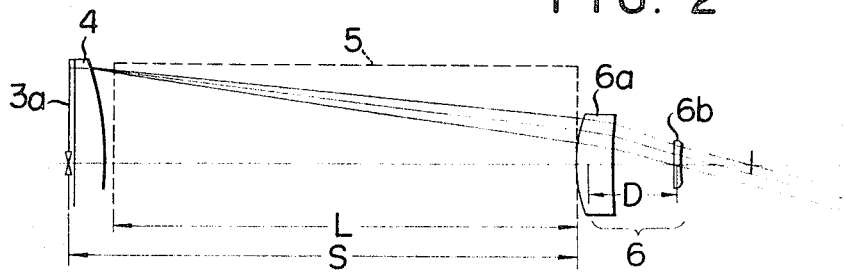
FIG. 2 is an equivalent optical path thereof.

In the viewfinder system of a single-lens reflex camera as shown in FIG. 1, the light rays A passing through a camera lens 1 are reflected by a reflecting mirror 2 substantially by 90° to a ground or focusing glass 3 where the picture of a subject is focused upon the focal plane 3a. This image can be viewed through a condenser lens 4, a pentaprism 5, and a finder lens 6 by the eye 7. In this case, the magnification M of the viewfinder will be given by:

$$M = f_o/f_e \quad (1)$$

where $f_o$ = focal length of the object lens 1, and
$f_e$ = focal length of the finder lens 6.

Figure 4:
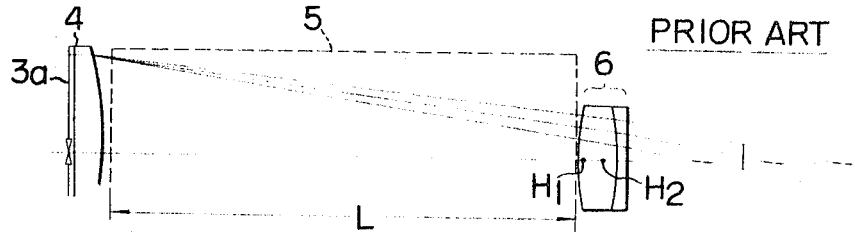
FIG. 4 is an equivalent optical path of a conventional finder system.

A conventional finder lens system consists of two positive and negative achromatic lenses as shown in FIG. 4 and its compound principal points are indicated by $H_1$ and $H_2$. The distance between the compound principal point $H_1$ and the focal plane 3a is made equal to the focal length of the finder lens 6 so that the viewfinder diopter may be in a range from −0.5 to −1. Since the finder lens system 6 is located rearwardly of the pentaprism 5 the minimum value of the focal length $f_e$ is limited by the length of the optical path L of the pentaprism 5. The effective or actual length or distance $La$ of the optical path of the pentaprism 5 will be given by:

$$La = L/n \quad (2)$$

where $n$ = refractive index of the pentaprism 5.
When $n=1.5$,
$La = L$.

For example when $f_o=55$ mm. and $f_e=55$ mm., the magnification becomes substantially unity.

In case of the porromirror system or hollow penta-roof-type reflecting mirror being used instead of the pentaprism, $n=1$ so that $La=L$. Consequently $f_e$ becomes longer so that the magnification of the viewfinder is reduced to the order of 0.6 from the unity or 0.9 when the pentaprism is used. As is clear from Eq. (1), the magnification will be reduced when a short focal length lens is used in a single-lens reflex camera utilizing a pentaprism so that the focus adjustment becomes difficult.

The present invention contemplates to eliminate such defects as described above. Referring to FIG. 1, a positive lens group 6a consisting of positive lenses 6aa and 6ab and having a compound focal length of $f_1$ is spaced apart from a negative lens 6b having a focal length of $f_2$ by a distance D. The compound focal length $f_e$ of the finder lens system is made almost equal to the focal length $f_o$, and the focal point on the side of the subject of the finder lens system 6 is made coincident with the focal plane 3a. The compound focal length $f_e$ and the length S between the front surface of the finder lens system 6 and the focal plane 3a will be given by the following relations:

$$f_e = \frac{f_1 \cdot f_2}{f_1 + f_2 - D} \quad (3)$$

$$S = \frac{(f_2 - D)f_1}{f_1 + f_2 - D} \quad (4)$$

As described above, $f_e$ is almost equal to $f_o$; S is a constant that is slightly larger than $f_e$ which is determined by the length of the optical path of the penta-roof-type reflecting mirror 5; and $S/f_e$ is a constant larger than unity.

From Eqs. (3) and (4), $$S/f_e = 1 - D/f_2 = \text{const.}$$

$$\frac{dD}{df_2} = 1 - S/f_2 < 0 \quad (5)$$

It will be readily seen that the larger the radius of curvature of each lens the larger the absolute values $|f_1|$ and $|f_2|$ and that the aberration of the finder lens may be well corrected.

Figure 3:
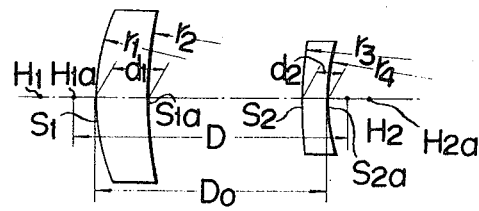
FIG. 3 is for explanation of the principle of the finder lens system of FIG. 1.

The dimensions of the finder lens system 6 as shown in FIG. 1 are limited so that D is limited. FIG. 3 shows that D is optically increased. As is clear from the equation for obtaining the principal point of a single lens, when $f_e$ is constant, the aberration may be well corrected by increasing D and the absolute values $|f_1|$ and $|f_2|$ by increasing the absolute values of the distance $H_{1a} \cdot S_{1a}$ between the second principal point $H_{1a}$ of the first lens 6a and the rear surface $S_a$ of the first lens 6a and the distance $H_a \cdot S_2$ between the first principal point $H_2$ of the second lens 6b and the front surface $S_2$ of the second lens 6b. In case of the first lens 6a having a refractive index $n_1$, $$f_1 = \frac{n_1 r_1 r_2}{(n_1-1)(n_1(r_2-r_1)+(n_1-1)d_1)}$$

and $$H_{1a} \cdot S_{1a} = \frac{r_x d_1}{n_1(r_2-r_1)+n_1-1} = \frac{n_1-1}{n_1} \cdot f_1 d_1 \cdot 1/r_1$$

It will be readily seen that the smaller $r_1$ the larger the distance $H_{1a} \cdot S_{1a}$. In the similar manner in case of the second lens 6b, having a refractive index $n_2$, $$H_2 \cdot S_2 = \frac{r_3 d_2}{n_2(r_4-r_3)+(n_2-1)d_2}$$

$$= \frac{(n_2-1)}{n_2} \cdot f_2 \cdot d_2 \cdot \frac{1}{r_4}$$

and it will be readily seen also that the smaller $r_4$ the larger the distance $H_2 \cdot S_2$. Therefore, the absolute values of $|f_1|$ and $|f_2|$ may be optically made larger even if $D_o$ is limited in view of a camera design by utilizing meniscus-type lenses as first and second lenses 6a and 6b. Furthermore, in order to eliminate the chromatic aberration of the finder lens system, the second lens 6b is made of an SF type or series material having a high refractive index but a low dispersitive power and the radius of curvature is made larger while the first lens 6a is made of a LaK of KaLk type series material which can sufficiently correct the aberration caused by the second lens 6b.

One example of the finder lens system according to the present invention satisfying the above-described conditions in single-lens reflex camera will be described. In a 35 mm. single-lens reflex camera in which focal length of an object lens $f=55$ mm.
length of optical path of penta-roof-type reflecting mirror = 82,919 mm., and
distance between the condenser lens and the reflecting mirror = 1.4 mm.,

| | R radius of curvature (mm.) | D distance (mm.) | N material |
|---|---|---|---|
| 1 | ∞ | 5.5 | BK 7 condenser lens 4 ($n_D=1.51633$, $\mu_D=64.0$). |
| 2 | −55 | 84.319 (82.919+1.4) | |
| 3 | 32.8 | 2.75 | LaLK5 first lens 6aa ($n_D=1.69350$, $\mu_D=50.7$). |
| 4 | 98.5 | 0.5 | |
| 5 | 32.8 | 2.75 | LaLK5 first lens 6ab. |
| 6 | 98.5 | 11.0 | |
| 7 | 92.5 | 1.0 | SF 10 second lens 6b ($n_D=1.72825$, $\mu_D=28.3$). |
| 8 | 21.3 | | |

Focal length of finder lens system $f_e=63.0$ mm.
Position of entrance pupil spaced apart from the front surface of the finder lens system by 12 mm.
Diameter of pupil: 8 mm.
Viewing diopter $=-3$, and
Viewing field $=33\times 22$ mm.
The aberrations are as follows:

| Height of image (mm.) | Distortion percent | Coma (D line) | (D-i max.) |
|---|---|---|---|
| 20 | 0.13 | 0.2 | 0.19 |
| 16.5 | 0.008 | 0.09 | 0.15 |
| 11.0 | −0.075 | 0.04 | 0.09 |

It will be seen that the distortion is less than 0.1 percent all over the viewing field; the coma is sufficiently small enough for a viewfinder system; and the viewfinder magnification is 0.9 that is almost equal to that obtained when a pentaprism is used. Thus, a small- or large-sized single-lens reflex camera utilizing a synthetic resin penta-roof-type reflecting mirror light in weight and inexpensive to manufacture can be fabricated at less cost with a viewfinder system which can well stand comparison with the conventional viewfinder in function. Furthermore, when the present invention is applied with a pentaprism, a single-lens reflex camera in which the focus adjustment may be readily made even when a lens having a shorter focal length is provided.

I claim:
1. A finder lens system for a single-lens reflex camera having an optical axis passing therethrough consisting of:
a hollow penta-roof-type reflecting mirror through which said optical axis enters in one direction and exits at 90° thereto;
an object lens located on said optical axis adjacent the entrance side of said reflecting mirror, said object lens having a predetermined focal length, and a focusing glass for receiving an image projected by a camera lens, said focusing glass located in front of said object lens in the focal

DESIGN FACTOR TABLE

| | R, radius of curvature (mm.) | D, distance (mm.) | N materials |
|---|---|---|---|
| 1 | ∞ | 5.5 | BK7 condenser lens 4 ($n_D=1.51633$, $\mu_D=64.0$). |
| 2 | −55 | 84.319 | |
| 3 | 32.8 | 2.75 | LaLK5 first lens 6aa ($n_D=1.69350$, $\mu_D=50.7$). |
| 4 | 98.5 | 0.5 | |
| 5 | 32.8 | 2.75 | LaLK5 first lens 6ab. |
| 6 | 98.5 | 11.0 | |
| 7 | 92.5 | 1.0 | SF10 second lens 6b ($n_D=1.72825$, $\mu_D=28.3$). |
| 8 | 21.3 | | | and the compound focal length length of the finder lens system $f_e=63.0$ mm.

plane of said camera lens;
a positive meniscus lens group located on said optical axis adjacent the exit side of said reflecting mirror, said positive lens group consisting of two positive meniscus spaced-apart lens elements;
a negative lens located on said optical axis spaced from said positive lens group on the exit side of said optical axis from said reflecting mirror;
said positive lens group and negative lens having a compound focal length substantially equal to the focal length of said object lens; and
the focal point of said positive lens group and negative lens taken in combination coinciding with said focal plane.

2. A finder lens system for a 35 mm. single-lens reflex camera in which a focal length of an object lens $f=55$ mm., a length of optical path of a penta-roof-type reflecting mirror = 22,919 mm. and a distance between a condenser lens and said reflecting mirror = 1.4 mm., satisfying the following design factor table:

UNITED STATES PATENT OFFICE
CERTIFICATE OF CORRECTION

Patent No. 3,587,383          Dated June 28, 1971

Inventor(s) Yohei Ikezu

It is certified that error appears in the above-identified patent and that said Letters Patent are hereby corrected as shown below:

Column 1, line 59,    change "$f_e$" to -- $f_o$ --;

Column 2, line 1,     change "La = L" to -- La = 2/3L --;

Column 3, line 11,    change "82,919" to -- 82.919 --;

Column 3, line 35,    change "D-i max." to -- (D-f) Max. --;

Column 4, lines 15-30,  Table in these lines to follow line 50 in claim 2;

Column 4, line 48,    change "22,919" to -- 22.919 --.

Signed and sealed this 8th day of February 1972.

(SEAL)
Attest:

EDWARD M.FLETCHER,JR.          ROBERT GOTTSCHALK
Attesting Officer              Commissioner of Patents